US012681838B2

(12) United States Patent
Mendelowitz et al.

(10) Patent No.: US 12,681,838 B2
(45) Date of Patent: Jul. 14, 2026

(54) HYBRID LEARNING OF EXPERT HEURISTICS, MACHINE AND DEEP LEARNING FOR RANKING AUTOMOTIVE-GRADE APPLICATIONS

(71) Applicant: Red Bend Ltd., Hod Ha'Sharon (IL)

(72) Inventors: Shachar Mendelowitz, Hertzeliya (IL);
Jonathan Katz, Lod (IL); Ori Goldberg, Kiryat Ono (IL); Yosef Golan, Tel Aviv (IL)

(73) Assignee: RED BEND LTD., Hod Hasharon (IL)

( * ) Notice: Subject to any disclaimer, the term of this patent is extended or adjusted under 35 U.S.C. 154(b) by 216 days.

(21) Appl. No.: 18/573,901

(22) PCT Filed: Jun. 25, 2021

(86) PCT No.: PCT/IL2021/050781
§ 371 (c)(1),
(2) Date: Dec. 22, 2023

(87) PCT Pub. No.: WO2022/269588
PCT Pub. Date: Dec. 29, 2022

(65) Prior Publication Data
US 2024/0289255 A1 Aug. 29, 2024

(51) Int. Cl.
*G06F 11/362* (2025.01)
*G06N 3/08* (2023.01)
(52) U.S. Cl.
CPC ........... *G06F 11/3636* (2013.01); *G06N 3/08* (2013.01)
(58) Field of Classification Search
None
See application file for complete search history.

(56) References Cited

U.S. PATENT DOCUMENTS

2018/0300227 A1* 10/2018 Bergen ................. G06F 11/079
2019/0004920 A1* 1/2019 Vandriessche ...... G06F 30/3312
(Continued)

FOREIGN PATENT DOCUMENTS

CN 111222141 A 6/2020
WO 2018060250 A1 4/2018
(Continued)

OTHER PUBLICATIONS

ISA Israel Patent Office, International Search Report and Written Opinion Issued in Application No. PCT/IL2021/050781, Sep. 30, 2021, WIPO, 9 pages.
(Continued)

*Primary Examiner* — Lewis A Bullock, Jr.
*Assistant Examiner* — Mark A Gooray
(74) *Attorney, Agent, or Firm* — McCoy Russell LLP

(57) ABSTRACT

Disclosed herein are methods and systems for training and using a neural network to evaluate vulnerability of software packages, comprising using a plurality of training samples each associating one of a plurality of software packages with one of a plurality of vulnerabilities identified by one of a plurality of validators to training the neural network to compute a probability of presence of one or more of the plurality of vulnerabilities in each of the plurality of software packages and outputting the trained neural network. The validators may include expert knowledge, heuristics, rule-based models as well as machine learning and deep learning models. The trained neural network may be then applied to compute a probability of presence of one or more of the vulnerabilities in one or more previously unseen software packages based on a feed of vulnerabilities identified in the previously unseen software package(s) by the plurality of validators.

16 Claims, 10 Drawing Sheets

(56) References Cited

U.S. PATENT DOCUMENTS

| | | | |
|---|---|---|---|
| 2019/0377880 A1 | 12/2019 | Kolychev et al. | |
| 2020/0320202 A1 | 10/2020 | Farkash et al. | |
| 2021/0034753 A1 | 2/2021 | Canada et al. | |
| 2021/0056211 A1 | 2/2021 | Olson et al. | |
| 2021/0110047 A1* | 4/2021 | Fang | G06F 16/27 |
| 2021/0117305 A1* | 4/2021 | Raszka | G06F 11/3608 |
| 2022/0171697 A1* | 6/2022 | Moukahal | G06F 11/3684 |

FOREIGN PATENT DOCUMENTS

| | | | |
|---|---|---|---|
| WO | 2020114920 A1 | 6/2020 | |
| WO | 2020252529 A1 | 12/2020 | |
| WO | 2022269588 A1 | 12/2022 | |

OTHER PUBLICATIONS

International Bureau of WIPO, International Preliminary Report on Patentability Issued in Application No. PCT/IL2021/050781, Jan. 4, 2024, WIPO, 6 pages.

Dibaei, M. et al., "An Overview of Attacks and Defences on Intelligent Connected Vehicles," ArXiv Cornell University Website, Available Online at https://arxiv.org/abs/1907.07455, Available as Early as Jul. 17, 2019, 36 pages.

European Patent Office, Supplementary European Search Report Issued in Application No. 21946940.0, Dec. 20, 2024, Germany, 8 pages.

State Intellectual Property Office of the People's Republic of China, Office Action and Search Report Issued in Application No. 202180099779.5, Apr. 23, 2026, 24 pages. (Submitted with Partial Translation).

European Patent Office, Office Action Issued in Application No. 21946940.0, Apr. 10, 2026, Germany, 6 pages.

* cited by examiner

700

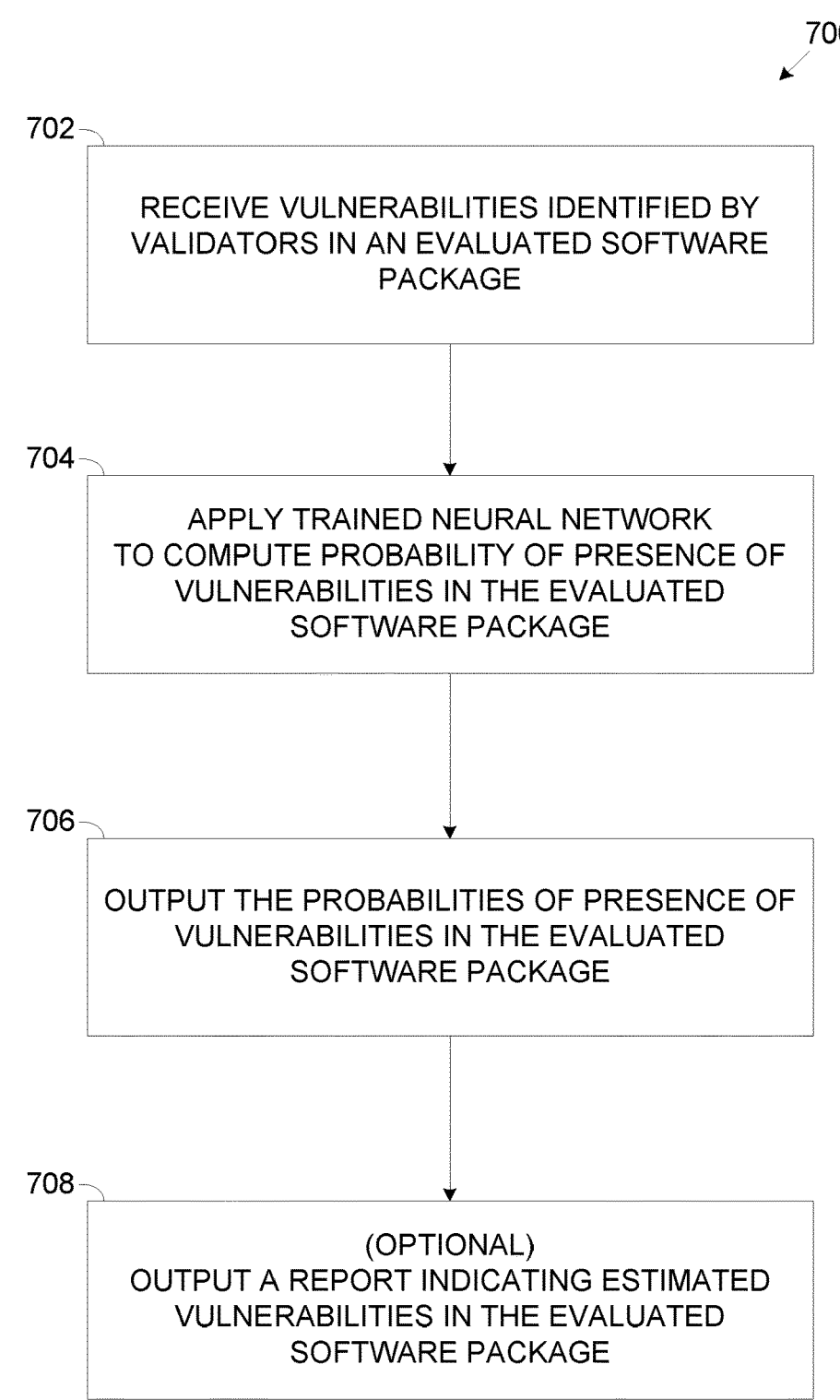

702

RECEIVE VULNERABILITIES IDENTIFIED BY VALIDATORS IN AN EVALUATED SOFTWARE PACKAGE

704

APPLY TRAINED NEURAL NETWORK TO COMPUTE PROBABILITY OF PRESENCE OF VULNERABILITIES IN THE EVALUATED SOFTWARE PACKAGE

706

OUTPUT THE PROBABILITIES OF PRESENCE OF VULNERABILITIES IN THE EVALUATED SOFTWARE PACKAGE

708

(OPTIONAL) OUTPUT A REPORT INDICATING ESTIMATED VULNERABILITIES IN THE EVALUATED SOFTWARE PACKAGE

FIG. 7

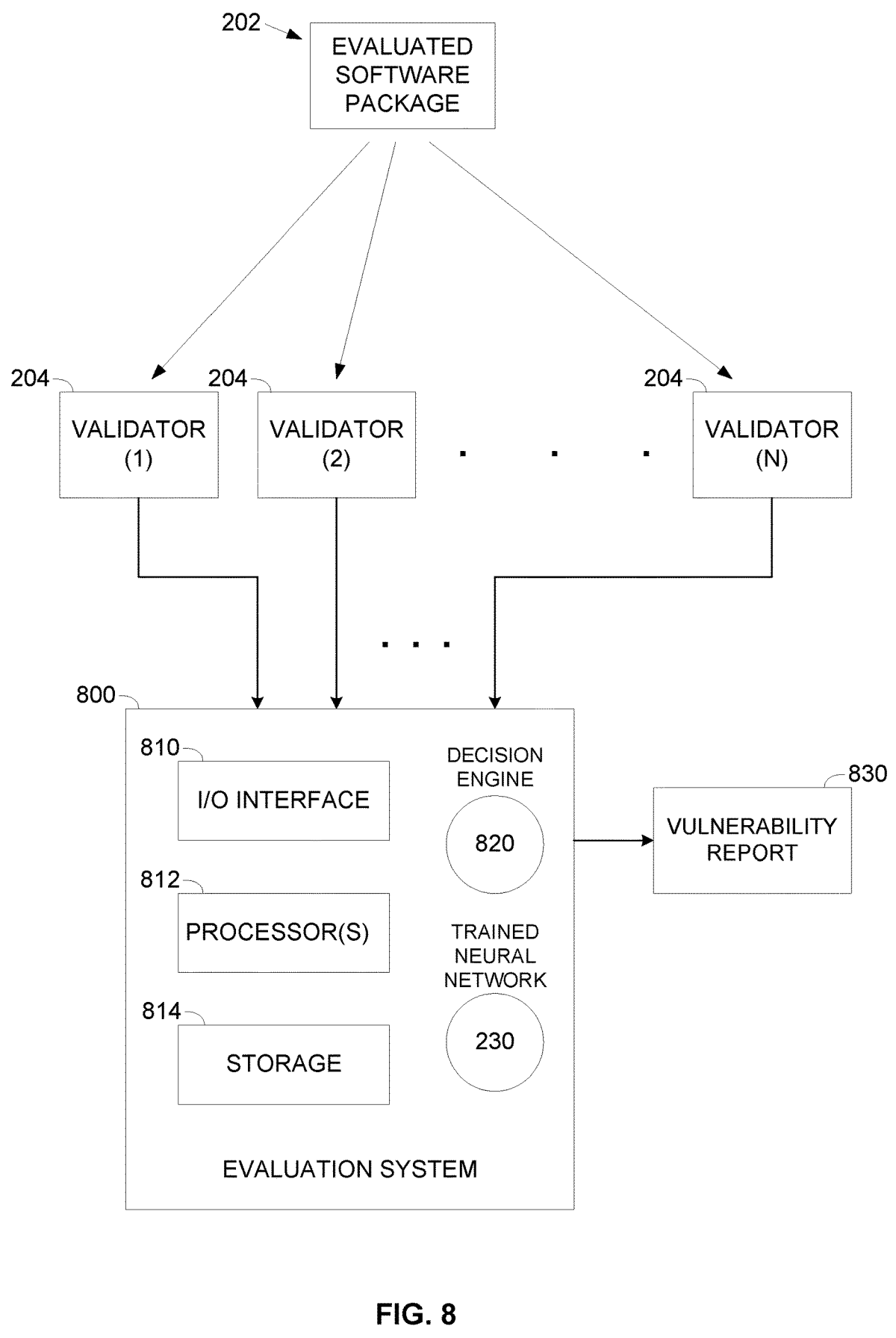

202 — EVALUATED SOFTWARE PACKAGE

204 — VALIDATOR (1)    204 — VALIDATOR (2)    ·  ·  ·  ·    204 — VALIDATOR (N)

800 — EVALUATION SYSTEM

810 — I/O INTERFACE

812 — PROCESSOR(S)

814 — STORAGE

DECISION ENGINE
820

TRAINED NEURAL NETWORK
230

830 — VULNERABILITY REPORT

FIG. 8

HYBRID LEARNING OF EXPERT HEURISTICS, MACHINE AND DEEP LEARNING FOR RANKING AUTOMOTIVE-GRADE APPLICATIONS

CROSS-REFERENCE TO RELATED APPLICATIONS

The present application is a U.S. National Phase of International Patent Application Serial No. PCT/IL2021/050781 entitled "HYBRID LEARNING OF EXPERT HEURISTICS, MACHINE AND DEEP LEARNING FOR RANKING AUTOMOTIVE-GRADE APPLICATIONS," filed on Jun. 25, 2021. The entire contents of each of the above-referenced applications are hereby incorporated by reference for all purposes.

BACKGROUND

Some embodiments described herein relate to ranking software packages, and, more specifically, but not exclusively, to ranking automotive-grade software packages using a trained neural network applied to a set of vulnerabilities identified in the software packages by expert users, automated tools applying learned heuristics and machine learning technologies.

The constant and rapid evolution of automated vehicles, whether partially automatic and/or fully autonomous, has brought software based systems to gradually gain control over more and more systems, functionalities and services of the automated vehicles ranging from infotainment and weather control systems through navigation and communication to critical applications and systems relating to vehicle operation, safety systems and/or the like.

Vulnerabilities in software code files, whether unintentionally injected or maliciously applied, may impose major threats and risks such as, for example, security breaches, privacy violation, user attention distraction, malicious intervention and/or the like. One or more of these vulnerabilities may lead to unexpected and/or undesired execution of the code which in turn may affect the hardware (e.g. device, apparatus, system, platform, etc.) executing the code and/or other systems in communication with the affected platform. Moreover, such vulnerabilities may be exploited to compromise the code and its executing hardware for one or more malicious ends.

While of course undesired in any software code, vulnerabilities in automotive grade software code may obviously have much graver consequences as it may affect critical vehicular systems which failing and/or compromised may lead to loss of control over the vehicle which may cause major damage, injury and even causalities.

SUMMARY

According to a first aspect described herein there is provided a computer implemented method of training a neural network to evaluate vulnerability of software packages, comprising using one or more processors for: receiving a plurality of training samples each associating one of a plurality of software packages with one of a plurality of vulnerabilities identified by one of a plurality of validators, training a neural network using the plurality of training samples to compute a probability of presence of one or more of the plurality of vulnerabilities in each of the plurality of software packages, and outputting the trained neural network for computing a probability of presence of the one or more vulnerabilities in one or more previously unseen software packages based on a feed of vulnerabilities identified in the one or more previously unseen software packages by the plurality of validators.

According to a second aspect described herein there is provided a system for training a neural network to evaluate vulnerability of software packages, comprising one or more processors adapted to execute code, the code comprising: code instructions to receive a plurality of training samples each associating one of a plurality of software packages with a respective one of a plurality of vulnerabilities identified by one of a plurality of validators, code instructions to train a neural network using the plurality of training samples to compute a probability of presence of one or more of the plurality of vulnerabilities in each of the plurality of software packages, and code instructions to output the trained neural network for computing a probability of presence of the one or more vulnerability labels in one or more previously unseen software packages based on a feed of vulnerabilities identified in the one or more previously unseen software packages by the plurality of validators.

According to a third aspect described herein there is provided a computer implemented method of evaluating vulnerability of software packages, comprising using one or more processors for: receiving one or more of a plurality of vulnerabilities identified in an evaluated software package by a plurality of validators, feeding the one or more vulnerabilities to a neural network trained to compute a probability of presence of one or more occurrences of the one or more vulnerabilities in the evaluated software package, the neural network is trained using a plurality of training samples associating a plurality of software packages with one or more of the plurality of vulnerabilities identified in the plurality of software packages by the plurality of validators, and outputting the probability of presence of the one or more occurrences of the one or more vulnerabilities in the evaluated software package.

According to a fourth aspect described herein there is provided a system for evaluating vulnerability of software packages, comprising one or more processors adapted to execute code, the code comprising: code instructions to receive one or more of a plurality of vulnerabilities identified in an evaluated software package by a plurality of validators, code instructions to feed the one or more vulnerabilities to a neural network trained to compute a probability of presence of one or more occurrences of the one or more vulnerabilities in the evaluated software package, the neural network is trained using a plurality of training samples associating a plurality of software packages with one or more of the plurality of vulnerabilities identified in the plurality of software packages by the plurality of validators, and code instructions to output the probability of presence of the one or more occurrences of the one or more vulnerabilities in the evaluated software package.

In a further implementation form of the first, second, third and/or fourth aspects, the plurality of software packages are directed for execution in one or more vehicles where each of the plurality of vulnerabilities may potentially compromise operation of the one or more vehicles.

In a further implementation form of the first, second, third and/or fourth aspects, each of the plurality of vulnerabilities imposes one or more risks when the respective software package is executed, the one or more risk are members of a group consisting of: a security risk, a privacy risk, a user attention distraction risk and a malicious intervention risk.

In a further implementation form of the first, second, third and/or fourth aspects, the plurality of vulnerabilities comprise one or more of: a vulnerability potentially leading to improper execution of one or more software packages and a vulnerability exploitable for compromising the execution of one or more software packages.

In a further implementation form of the first, second, third and/or fourth aspects, the plurality of validators comprise one or more machine learning (ML) models trained in one or more supervised training sessions to identify the one or more vulnerabilities in one or more of the plurality of software packages.

In a further implementation form of the first, second, third and/or fourth aspects, the plurality of validators comprise one or more deep learning (DL) models trained in one or more training sessions to identify the one or more vulnerability in one or more of the plurality of software packages, the one or more training sessions are members of a group consisting of: a supervised training session using labeled training samples, an unsupervised training session using unlabeled training samples and a semi-supervised training session using labeled and unlabeled training samples.

In a further implementation form of the first, second, third and/or fourth aspects, the plurality of validators comprise one or more rule based models configured to analyze one or more of the plurality of software packages according to one or more of a plurality of heuristics.

In a further implementation form of the first, second, third and/or fourth aspects, the plurality of validators comprise one or more exploitation vulnerability detection tools designed to identify one or more potential exploitation vulnerability in one or more of the plurality of software packages.

In a further implementation form of the first, second, third and/or fourth aspects, the plurality of validators comprise one or more expert users manually analyzing one or more of the plurality of software packages.

In a further implementation form of the first, second, third and/or fourth aspects, one or more of the plurality of validators is based on static code analysis of one or more of the plurality of software packages.

In a further implementation form of the first, second, third and/or fourth aspects, one or more of the plurality of validators is based on dynamic code analysis of one or more of the plurality of software packages.

In a further implementation form of the first, second, third and/or fourth aspects, the dynamic analysis is executed in a sandbox environment of one or more evaluation systems isolated from an operational execution environment of the one or more evaluation systems.

In an optional implementation form of the third and/or fourth aspects, the neural network is trained in one or more supervised training sessions with one or more dataset comprising training samples associating a plurality of software packages with respective vulnerability labels.

In an optional implementation form of the third and/or fourth aspects, a report indicative of each vulnerability identified in the evaluated software package is generated automatically.

Unless otherwise defined, all technical and/or scientific terms used herein have the same meaning as commonly understood by one of ordinary skill in the art to which some embodiments described herein pertain. Although methods and materials similar or equivalent to those described herein can be used in the practice or testing of embodiments described herein, exemplary methods and/or materials are described below. In case of conflict, the patent specification, including definitions, will control. In addition, the materials, methods, and examples are illustrative only and are not intended to be necessarily limiting.

Implementation of the method and/or system of some embodiments described herein can involve performing or completing selected tasks manually, automatically, or a combination thereof. Moreover, according to actual instrumentation and equipment of the method and/or system of embodiments described herein, several selected tasks could be implemented by hardware, by software or by firmware or by a combination thereof using an operating system.

For example, hardware for performing selected tasks according to some embodiments described herein could be implemented as a chip or a circuit. As software, selected tasks according to some embodiments described herein could be implemented as a plurality of software instructions being executed by a computer using any suitable operating system. In exemplary embodiments described herein, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments are described herein by way of example only, with reference to the accompanying drawings. With specific reference now to the drawings in detail, it is stressed that the particulars shown are by way of example and for purposes of illustrative discussion of embodiments described herein. In this regard, the description taken with the drawings makes apparent to those skilled in the art how embodiments described herein may be practiced.

In the drawings:

FIG. 7 is a flowchart of an exemplary process of estimating presence of vulnerabilities in an evaluated software package using a trained neural network, according to some embodiments described herein;

FIG. 8 is a schematic illustration of an exemplary system for estimating presence of vulnerabilities in an evaluated software package using a trained neural network, according to some embodiments described herein;

DETAILED DESCRIPTION

Figure 1:
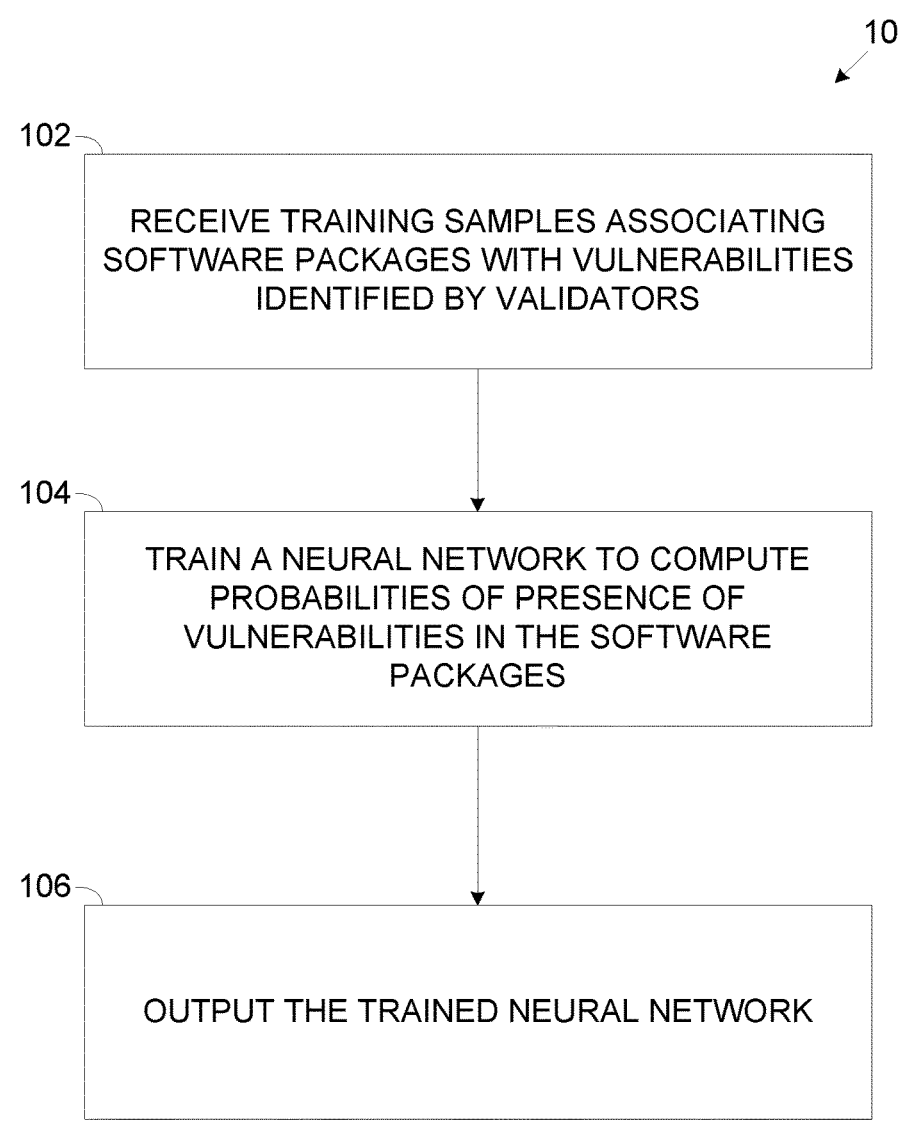
FIG. 1 is a flowchart of an exemplary process of training a neural network to estimate presence of potential vulnerabilities in software packages based on vulnerabilities identified in the software packages by a plurality of validators, according to some embodiments described herein.

Some embodiments described herein relate to ranking software packages, and, more specifically, but not exclusively, to ranking automotive-grade software packages using a trained neural network applied to a set of vulnerabilities identified in the software packages by expert users, automated tools applying learned heuristics and machine learning technologies.

According to some embodiments described herein, there are provided methods, systems and computer program products for training one or more Machine Learning (ML) models, in a particular a neural network to estimate a probability (score) of presence of one or more vulnerabilities in one or more software packages based on detection of the vulnerabilities by a hybrid collection of a plurality of validators comprising, expert knowledge, predefined heuristics and learned patterns relating to a plurality of code attributes of the software packages, for example, design, structure, layout, execution and/or the like.

In particular, the neural network may be trained and applied to estimate presence of the vulnerabilities in automotive grade software package, for example, Android Application Package (APK) and/or the like, directed and intended for execution in a vehicular environment by one or more vehicular systems installed, integrated and/or otherwise functional and/or communicatively coupled to vehicles.

The vulnerabilities which may be present in one or more software code segments, for example, an instruction, a process, a routine, a system call, a file, a library and/or the like of a software package may potentially lead to improper, unexpected and/or undesired execution of the respective software package deviating from its designed execution path, be exploitable in attempt to compromise execution of the respective software package and/or the like. One or more of the vulnerabilities may be unintentionally included in a software package due to, poor design practice, interface error between interacting software modules, improper variables definition and/or the like. However, one or more of the vulnerabilities may be intentionally applied into a software package in attempt to exploit them in due time in attempt to compromise execution of the software package.

Vulnerabilities present in a software package may impose one or more risks when the software package is executed, for example, security risks, privacy violation risks, user attention distraction risks, malicious intervention risks and/or the like. These risks, in particular in the vehicular environment may affect one or more of the vehicle systems including vehicle operation control systems that may lead and potentially result in severe danger, damage, injury and/or causalities to the vehicle, the passengers, other vehicles and passengers, pedestrians, infrastructures and/or the like.

The neural network may be first trained using a plurality of training software packages. The plurality of validators may be applied to analyze the plurality of training APKs in order to identify one or more vulnerabilities in each of the training software packages.

The validators may include, for example, one or more expert users who may manually analyze at least some of the training software packages, specifically reports and/or logs generated based on one or more software code analyses, for example, static code analysis, dynamic code analysis and/or the like. In another example, the validators may include one or more rule based validators which may analyze the training software packages according to one or more predefined rules which may define conditions, scenarios, coding instances and/or the like which may be indicative of potential vulnerabilities. In another example, the validators may comprise one or more exploitation vulnerability detection tools, for example, an antivirus tool, a spyware detection tool, a malware detection tool and/or the like.

The validators may further include machine learning based validators, for example, one or more ML models, for example, a neural network, a classifier, a Support Vector Machine (SVM) and/or the like trained to identify one or more vulnerabilities in software packages. For example, the ML model(s) may be trained in a supervised manner using labeled data generated by one or more of the code analyses, for example, static analysis, dynamic analysis and/or the like to identify design and/or execution patterns indicative of potential vulnerabilities. The trained ML model(s) may be therefore applied to the training software packages to identify one or more of the patterns which may indicate of presence of one or more potential vulnerabilities in one or more of the training software packages.

In another example, the validators may include one or more Deep Learning (DL) models, specifically a deep neural network (DNN) trained to identify one or more vulnerabilities in software packages. The DL model(s) may be typically trained in supervised, semi-supervised and/or unsupervised sessions with a plurality of software packages to identify patterns, deviations, anomalies and/or the like in the software packages. The trained DL model(s) may be therefore applied to the training software packages to identify one or more patterns, deviations, anomalies which may be indicative of one or more vulnerabilities present in one or more of the training software packages.

The output of the validators, i.e. each training software package associated with each vulnerability identified in it by each of the validators may be used as a training dataset which may be used to train the neural network. During the training with the training software packages associated with their vulnerabilities identified by the plurality of validators, the neural network may learn, evolve, adapt and/or adjust, for example, by adjusting its inner propagation paths, adjusting edges weights and/or the like to compute a probability of presence of one or more vulnerabilities in each of the training software packages.

After trained using the hybrid technologies of validators comprising rule-based, machine learning and deep learning automated analysis optionally supplemented by expert manual analysis, the trained neural network may be applied to compute the probability of presence of one or more of the vulnerabilities in one or more new (previously unseen) evaluated software packages based on the vulnerabilities identified in each evaluated software package by the plurality of validators.

Using the hybrid technologies trained neural network to estimate presence of vulnerabilities in software packages based on the output of the versatile collection of validators may present significant benefits and advantages compared to currently existing methods and systems for evaluating code in general and software packages in particular to detect potential vulnerabilities.

First, applying any single one of the validators to estimate presence of potential vulnerabilities in the software packages as may be done by the existing methods may yield a highly limited vulnerability detection due to the limitation inherent to any single validation technology. The hybrid technologies trained neural network on the other hand, basically aggregates the vulnerability detection capabilities of a plurality of validators employing very different vulnerability detection measures, i.e., expert domain knowledge, heuristics, predefined rules, machine learning, and deep learning. The aggregated overall vulnerability detection capability and performance, for example, accuracy, reliability, consistency, robustness and/or the like may obviously significantly increase compared to the single technology based existing methods.

Moreover, the hybrid technologies trained neural network may be highly flexible and scalable as it may be trained, online and/or offline, using additional software packages thus continuously adapting and evolving to become highly robust and efficient in detecting the potential vulnerabilities including new vulnerabilities introduced and detected in the additional software packages.

Furthermore, as the neural network is trained and operated relying based on learning from a wide and versatile mixture of experts, the false positive detection rate of the neural network may be significantly reduced as it is not based on a single expert which may erroneously detect fault vulnerabilities but rater relies on the plurality of validators employing various vulnerability detection methods and technologies. Moreover, real vulnerabilities detections of a specific validator may be highlighted even when other validators may fail to detect these vulnerabilities thus boosting low confidence detections to increase the true positive rate. Thus, the neural network may form a conditional funnel of choosing and automatically weighing expert (validators) decisions.

The hybrid technologies trained neural network may be therefore highly effective in detecting the potential vulnerabilities in advance before such vulnerabilities may affect the execution of the software package or be maliciously exploited in attempt to compromise the software package and its executing platform. This capability may be of extreme value and advantage for the automotive grade software packages since vulnerabilities in such software packages executed by critical vehicular systems may lead to grave results including accidents, injuries and possibly loss of life.

Before explaining at least one embodiment in detail, it is to be understood that the embodiments are not necessarily limited in their application to the details of construction and the arrangement of the components and/or methods set forth in the following description and/or illustrated in the drawings and/or the Examples. The embodiments described herein are capable of other embodiments or of being practiced or carried out in various ways.

The embodiment described herein may include a system, a method, and/or a computer program product. The computer program product may include a computer readable storage medium (or media) having computer readable program instructions thereon for causing a processor to carry out aspects of the embodiment described herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the embodiment described herein may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the embodiment described herein.

Aspects of the embodiment described herein are described with reference to flowchart illustrations and/or block diagrams of methods, apparatus (systems), and computer program products according to embodiments described herein. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of described herein. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to the drawings, FIG. 1 is a flowchart of an exemplary process of training a neural network to estimate presence of potential vulnerabilities in software packages based on vulnerabilities identified in the software packages by a plurality of validators, according to some embodiments described herein.

An exemplary process 100 may be executed for training one or more ML models to estimate a probability (score) of presence of one or more vulnerabilities in one or more software packages, for example an APK and/or the like, specifically software packages directed for execution by one or more vehicular systems of one or more vehicles installed, integrated and/or otherwise functional and/or communicatively coupled to the vehicle.

The ML model(s), specifically a neural network may be trained to estimate the probability of presence of one or more vulnerabilities in evaluated software packages based on the vulnerabilities identified by a plurality of validators mostly automatic but also human may employ a plurality of analysis schemes, methods, techniques and algorithms, including, expert knowledge, predefined heuristics as well as ML models trained to identify such vulnerabilities in software packages.

The neural network may be therefore trained in one or more training sessions using one or more datasets associating a plurality of vulnerabilities with a plurality of software packages analyzed by the validators are identified.

Figure 2:
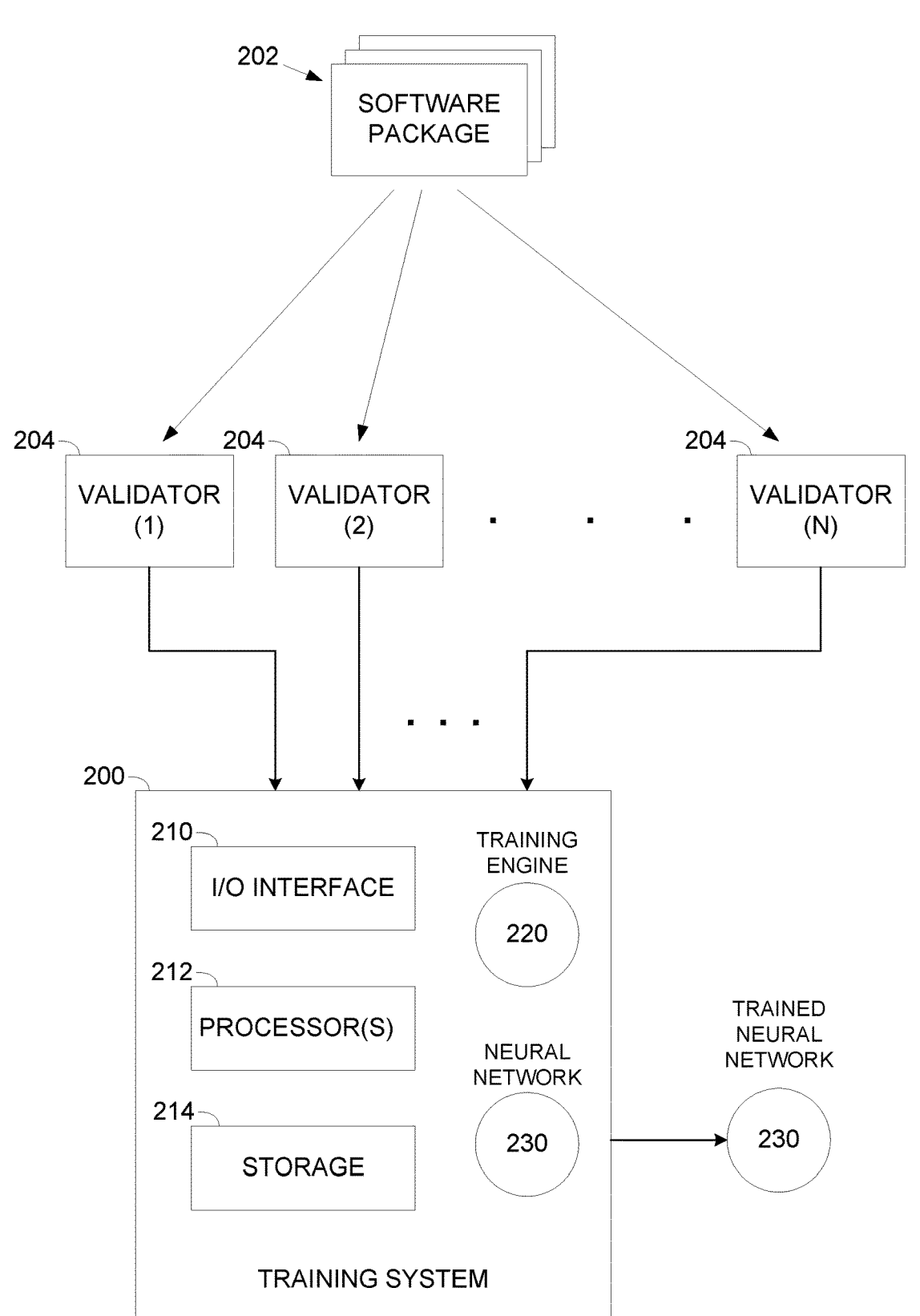
FIG. 2 is a schematic illustration of an exemplary system for training a neural network to estimate presence of potential vulnerabilities in software packages based on vulnerabilities identified in the APKs by a plurality of validators, according to some embodiments described herein.

Reference is also made to FIG. 2, which is a schematic illustration of an exemplary system for training a neural network to estimate presence of potential vulnerabilities in software packages based on vulnerabilities identified in the software packages by a plurality of validators, according to some embodiments described herein.

An exemplary training system 200, for example, a computer, a server, a processing node, a cluster of computing nodes and/or the like may be configured to execute a process such as the process 100 for training one or one or more ML models 230, for example, a neural network, a deep neural network, a Support Vector Machine (SVM) and/or the like to estimate probability of presence of one or more vulnerabilities in one or more software packages 202. However, the ML model(s) 230 may typically comprise one or more neural networks designated neural network 230 herein after.

As stated herein before, the software packages 202 may be directed for execution by one or more vehicular systems of one or more vehicles, for example, a system, a device, an Electronic Control Unit (ECU), an apparatus, a sensor and/or the like installed, integrated and/or otherwise functional and/or communicatively coupled to the vehicle. The vehicular systems, for example, a collision detection system, a breaking system, an autopilot system, a door lock system, a communication system, an infotainment system and/or the like may control one or more operations, actions and/or movement of the vehicle.

The neural network 230 may employ one or more neural network architectures, for example, a Convolutional Neural Network (CNN), a random forest classifier, a gradient boost based classifier and/or the like. One or more of the neural network 230 may further employ one or more deep learning neural network architectures, for example, a Feed Forward (FF) neural network, a Recurrent Neural Network (RNN) and/or the like.

The neural network 230 may be trained using one or more datasets associating a plurality of vulnerabilities identified in a plurality of training software packages 202 by a plurality of validators 204, for example, N validators 204, designated validator (1), validator (2) to validator (N).

The training system 200 may include an Input/Output (I/O) interface 210, a processor(s) 212 for executing the process 100 and storage 214 for storing code (program store) and/or data.

The I/O interface 210 may include one or more wired and/or wireless network interfaces for connecting to one or more networks, for example, a Local Area Network (LAN), a Wide Area Network (WAN), a Metropolitan Area Network (MAN), a cellular network, the internet and/or the like. The I/O interface 210 may further include one or more wired and/or wireless interconnection interfaces, for example, a Universal Serial Bus (USB) interface, a serial port, a Controller Area Network (CAN) bus interface, a Radio Frequency (RF) interface and/or the like.

Via the I/O interface 210, the training system 200 may obtain, for example, fetch, receive, acquire and/or the like the training dataset(s) and may provide, for example, transmit, output and/or the like the trained neural network 230. For example, the training system 200 may connect to one or more of the networks, through the network interface(s) of the I/O interface 210, to communicate with one or more remote networked resources to receive the vulnerabilities identified by one or more of the validators 204 in one or more of the software packages 202. The remote networked resource(s) may include, for example, one or more processing platforms (e.g. server, cloud computing, etc.) executing one or more of the validators 204. In another example, the remote networked resources may include one or more storage resources storing products of one or more of the validators 204, for example, the vulnerabilities identified in the software packages 202. In another example, the training system 200 may access one or more attachable devices attached to interconnection interface(s) available in the I/O interface 210, for example, a USB storage device storing, capturing and/or recording one or more training datasets comprising the vulnerabilities identified by one or more of the validators 204 in one or more of the software packages 202.

The processor(s) 212, homogenous or heterogeneous, may include one or more processing nodes arranged for parallel processing, as clusters and/or as one or more multi core processor(s). The storage 214 may include one or more non-transitory persistent storage devices, for example, a hard drive, a Flash array and/or the like. The storage 214 may also include one or more volatile devices, for example, a Random Access Memory (RAM) component and/or the like. The storage 214 may further include one or more network storage resources, for example, a storage server, a Network Attached Storage (NAS), a network drive, and/or the like accessible via one or more networks through the I/O interface 210.

The processor(s) 212 may execute one or more software modules such as, for example, a process, a script, an application, an agent, a utility, a tool, an Operating System (OS) and/or the like each comprising a plurality of program instructions stored in a non-transitory medium (program store) such as the storage 214 and executed by one or more processors such as the processor(s) 212. The processor(s) 212 may optionally, integrate, utilize and/or facilitate one or more hardware elements (modules) integrated and/or utilized in the training system 200, for example, a circuit, a component, an Integrated Circuit (IC), an Application Specific Integrated Circuit (ASIC), a Field Programmable Gate Array (FPGA), a Digital Signals Processor (DSP), a Graphic Processing Unit (GPU), an Artificial Intelligence (AI) accelerator and/or the like.

The processor(s) 212 may therefore execute one or more functional modules implemented using one or more software modules, one or more of the hardware modules and/or combination thereof. For example, the processor(s) 212 may execute a training engine 220 functional module for executing the process 100 to train one or more of the neural network 230 functional modules. The processor(s) 212 may further execute the neural network 230 during the training session(s).

Optionally, the training system 200, specifically the training engine 220 are provided and/or utilized by one or more cloud computing services, for example, Infrastructure as a Service (IaaS), Platform as a Service (PaaS), Software as a Service (SaaS) and/or the like provided by one or more cloud infrastructures, platforms and/or services such as, for example, Amazon Web Service (AWS), Google Cloud, Microsoft Azure and/or the like. In such case, the neural network 230 may be also executed by the cloud computing service(s) during the training session(s).

As shown at 102, the process 100 starts with the training engine 220 obtaining (e.g. receive, fetch, acquire, etc.) one or more datasets associating a plurality of vulnerabilities with a plurality of training software packages 202 in which the vulnerabilities are identified by the plurality of validators 204. This means that each of the software packages 202 used for training the ML model(s) 230 is associated with one or more vulnerabilities identified in the respective software package 202 by one or more of the of the validators 204.

The vulnerabilities may be present in one or more software code segments, for example, an instruction, a process, a routine, a system call, a file, a library and/or the like of one or more of the software packages 202 which may typically execute in the vehicle environment. The vulnerabilities may include one or more vulnerability types. For example, one or more vulnerabilities present in one or more of the software packages 202 may potentially lead to improper, unexpected and/or undesired execution of the respective software package 202 deviating from the designed execution path of the respective software package 202. In another example, one or more vulnerabilities present in one or more of the software packages 202 may be exploitable by one or more malicious parties in attempt to compromise execution of the respective software package 202.

The vulnerabilities may be unintentionally included in the software package 202 due to one or more reasons, for example, poor design practice, interface error between interacting software modules, improper variables definition and/or the like. However, one or more of the vulnerabilities may be intentionally applied into one or more of the software packages 202 in attempt to exploit them in due time in attempt to compromise execution of the respective software package 202.

The vulnerabilities may impose one or more risks when the respective software package 202 is executed and may therefore compromise operation of the vehicle. The risks may include one or more risks categories and/or types which may affect one or more of the vehicular systems, vehicle operation, passengers in the vehicle and/or surrounding environment of the vehicle, for example, other vehicles, pedestrians, infrastructures and/or the like.

For example, the risks may include one or more security risks exposing the software package 202 and hence the vehicle to one or more cybersecurity attack vectors, for example, gaining unauthorized access to one or more of the vehicular systems of the vehicle which may include critical and/or life safety systems. In another example, the risks may include one or more privacy violation risks, for example, unauthorized access to private data stored in the vehicle environment, interception of private communication (e.g. phone call, text message, mail, etc.), unauthorized capturing of images in the vehicle cabin and/or of the external environment and/or the like. In another example, the risks may include one or more user attention distraction risks in which one or more vulnerabilities may lead to initiating and/or conducting one or more operations and/or actions which may distract the attention of one or more users in the vehicle cabin, for example, a driver and/or a passenger. For example, one or more visual and/or audible stimulations may be initiated via one or more interfaces, for example, user interfaces such as, for example, a screen, a light source, an indication lamp, a speaker and/or the like which may distract user's attention. In another example, the risks may include one or more malicious intervention risks in which the respective software package 202, for example, a virus, a malware, a spyware, a ransomware, and/or the like injected and/or loaded for execution in the vehicular environment in attempt to compromise it as described herein before for the other risks.

The validators 204 may be implemented using a plurality of paradigms, methods, approaches and/or domains. The validators 204 may include mostly automated validators but also manual validators applied to analyze the software packages 202 to identify vulnerabilities in them for training the neural network 230.

Analysis of the software packages 202 may be also based on one or more software code analysis methods, techniques, tools and/or algorithms known in the art, for example, static code analysis, dynamic code analysis, malicious code detection analysis and/or the like.

Figure 3:
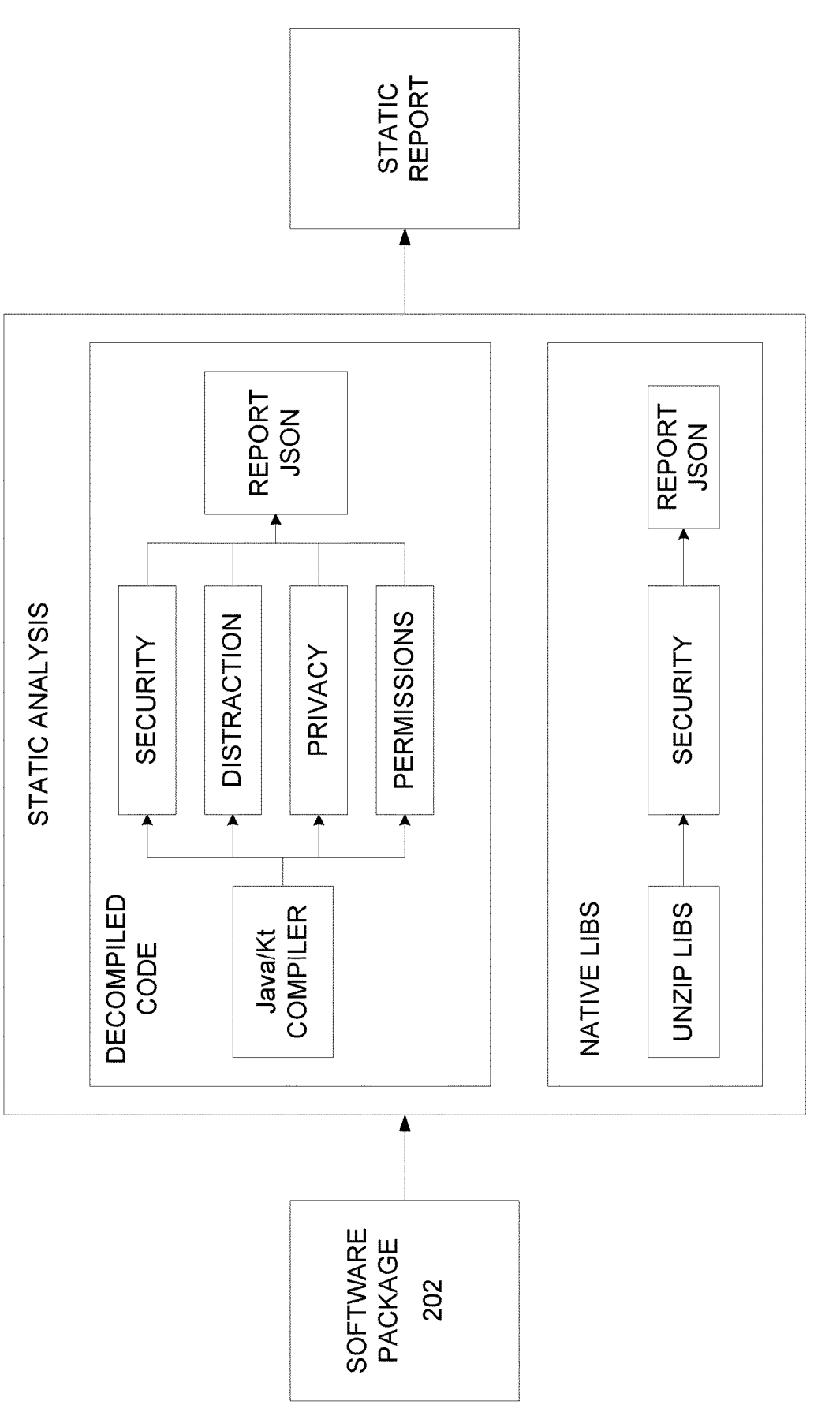
FIG. 3 and FIG. 4 are schematic illustrations of an exemplary static analysis applied to identify vulnerabilities in an APK.
Figure 4:
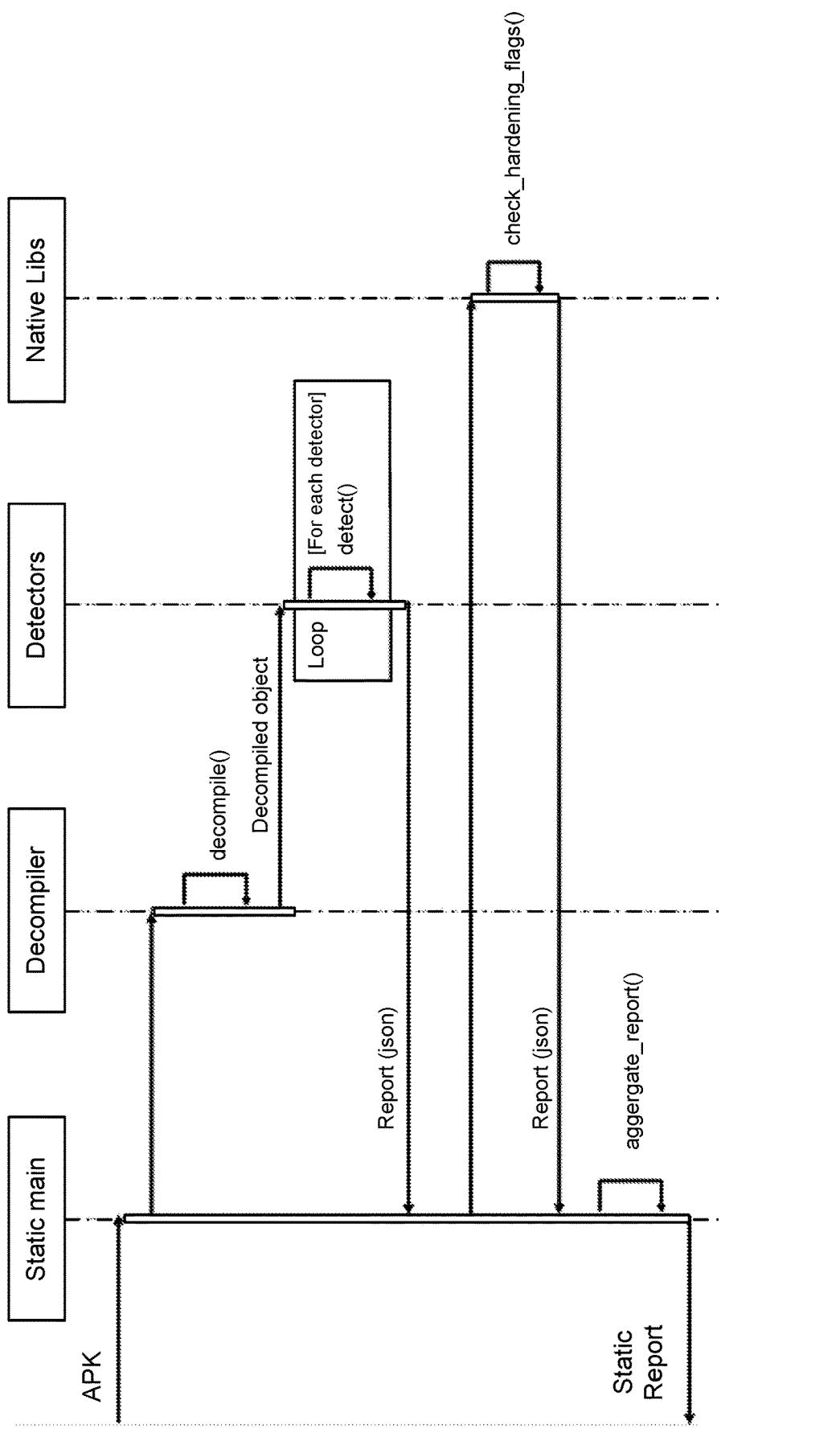

Reference is now made to FIG. 3 and FIG. 4, which are schematic illustrations of an exemplary static analysis applied to identify vulnerabilities in an APK. As seen in FIG. 3, static code analysis of one or more software packages such as the software package 202, for example, an APK may include analysis of decompiled code of the software package 202 and analysis of native libs included in the software package 202. The static analysis may further include analysis of the manifest file of one or more of the analyzed software packages 202.

The software package 202 may be decompiled using one or more tools, for example, Androguard python package and/or the like. A plurality of violation specific detectors may be then applied to search for violations in the decompiled code where each of the detector is defined to identify a respective violation. The detectors may be further configured to identify potential violations with respect to one or more attributes of the analyzed software package 202, for example, a type (e.g. driving control, infotainment, communication, user interactions, etc.), an interface with one or more other software modules and/or the like.

For example, a certain detector may be defined or set to identify one or more permission requests for permissions (e.g. location, user private information, etc.) that are not typically used and/or are typically forbidden for one or more of the software packages 202. In another example, a certain detector may be defined to identify one or more access to I/O interfaces (e.g. Bluetooth interface, Wi-Fi interface, etc.) which are not typically used and/or are typically forbidden for one or more of the software packages 202. In another example, a certain detector may be defined to identify one or more system service requests (e.g. driving control service, software update service, etc.) which are not typically used and/or are typically forbidden for one or more of the software packages 202. In another example, a certain detector may be defined to identify one or more Application Control Interface (API) calls which may not be typically used and/or are typically forbidden for one or more of the software packages 202.

A report indicative of the identified violations may be generated in one or more formats, for example, json and/or the like.

The native libs may be also analyzed during the static analysis to check for security hardening flags that may be included in them and respective report may be also generated.

The reports generated for the analysis of the decompiled code, the native libs and/or the manifest file may be then aggregated (combined) to generate an overall static analysis report.

As seen in FIG. 4, the static analysis flow may include decompiling the software package 202 code, for example the APK, applying the plurality of detectors to the decompiled objects, reporting the detected violations, check for hardening flags in the native libs and generating a respective report and finally aggregating the reports to create the overall static analysis report.

Figure 5:
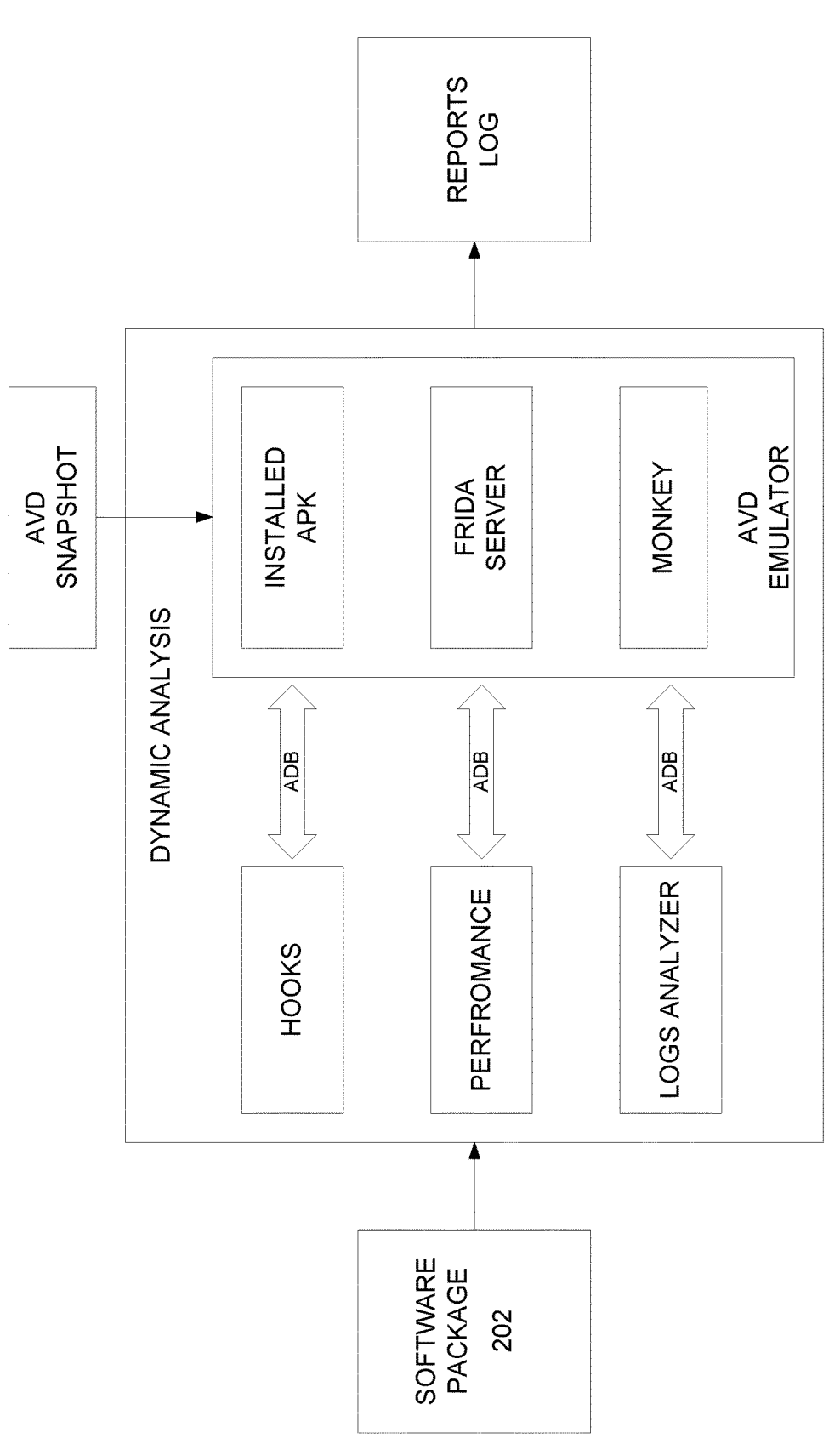
FIG. 5 and FIG. 6 are schematic illustrations of an exemplary dynamic analysis applied to identify vulnerabilities in an APK.
Figure 6:
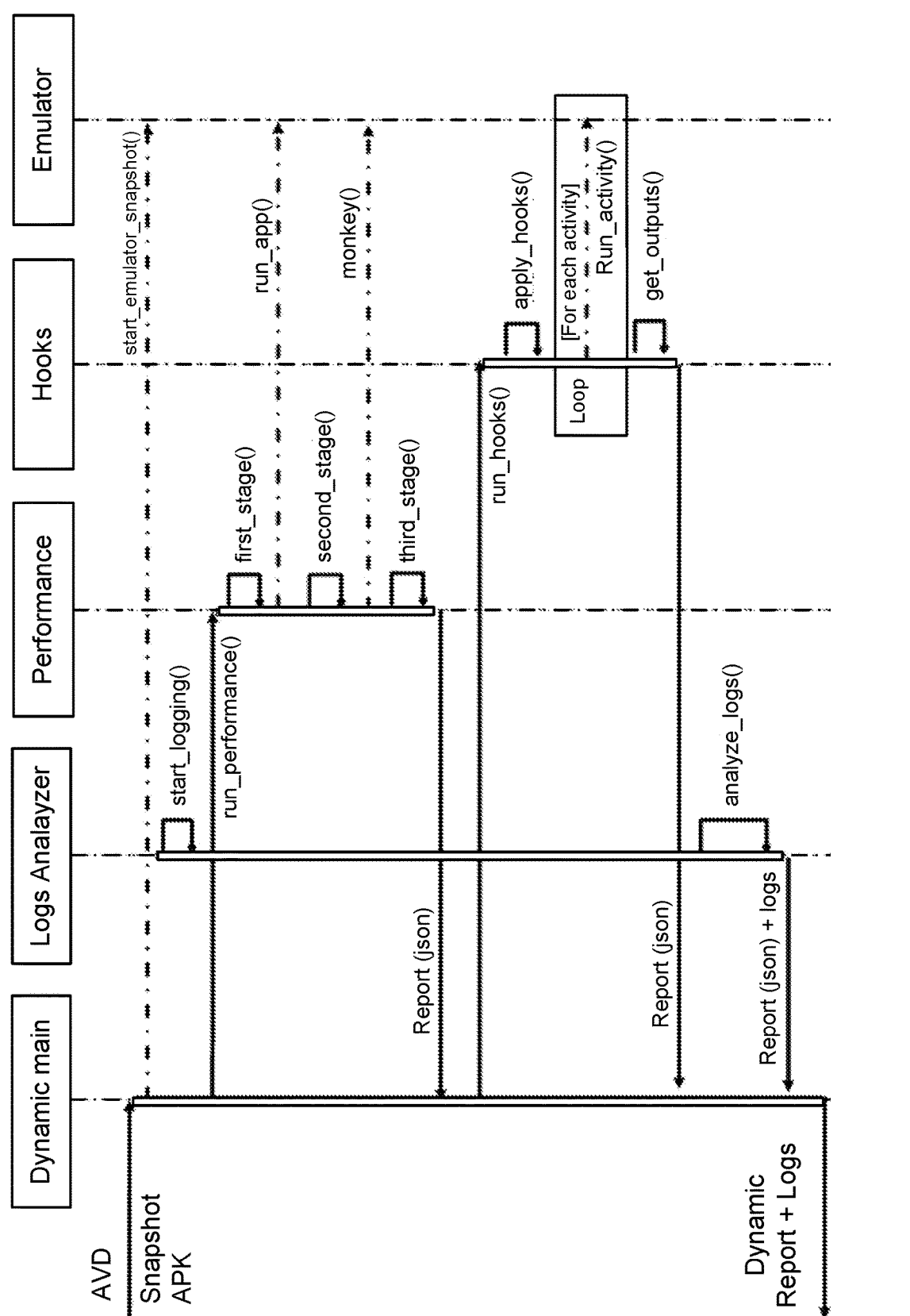

Reference is now made to FIG. 5 and FIG. 6, which are schematic illustrations of an exemplary dynamic analysis applied to identify vulnerabilities in an APK. As seen in FIG. 5, dynamic code analysis of one or more software packages such as the software package 202, for example, an APK may be conducted to analyze dynamic behavior, execution patterns and/or the like of the analyzed software package 202 when executed. The dynamic analysis conducted using one or more evaluation systems, devices and/or the like may be typically conducted in a secure environment isolated from the operational execution environment of the evaluation system(s), for example, in a sandbox environment such as, for example, Android Virtual Device (AVD).

The dynamic analysis may include inserting one or more hooks into one or more function calls of the software package 202 using one or more frameworks and/or tools, for example, Frida framework and/or the like. The analyzed software package 202 may be then executed and whenever a hook is activated the holed function call and at least part of the execution parameters are logged.

The dynamic analysis may further include performance analysis in which the analyzed software package 202 may be executed under different conditions in different scenarios, for example, after boot, during idle time, during heavy load conditions and/or the like for example, using monkey. The consumption and use of one or more computing resources of the evaluation system(s), for example, processor load, RAM usage, disk access and/or the like may be measured and logged during the execution of the analyzed software package 202.

The logs generated during the dynamic analysis may be then analyzed to identify violations in the logs. Analyzing the logs may be automatic using one or roe scripts and/or manual.

As seen in FIG. 6, the dynamic analysis flow may start with initiating the logging, for example, initiate one or more logging agents, create and/or open one or more log files. Performance analysis may be then conducted to execute the analyzed software package 202 and measure utilization of one or more of the computing resources under one or more of the execution conditions and/or scenarios. Hooks may be then applied to log execution of one or more function calls of the analyzed software package 202 and eventually the logs may be analyzed to identify possible violations.

As stated herein before, the validators 204 may include automated and manual validators applied to identify one or more of the vulnerabilities in one or more of the software packages 202 used for training the neural network 230 optionally based on the static code analysis and/or the dynamic code analysis.

For example, the validators 204 may include one or more expert users who may manually analyze one or more of the software packages 202, specifically the reports generated based on the static code analysis and/or the dynamic code analysis of the respective software package 202. Based on their knowledge and experience in the domain the expert user validator(s) 204 may provide an indication of one or more vulnerabilities they identified in one or more of the analyzed software packages 202, for example, a type of the vulnerability, a location of the vulnerability in the code, a location of the vulnerability in the execution path, potential impact of the vulnerability on the execution and/or the like.

In another example, the validators 204 may include one or more rule based models configured to analyze one or more of the software packages 202, specifically the reports generated based on the static code analysis and/or the dynamic code analysis of the respective software package 202. The rules based model(s) may comprise one or more predefined rules indicting one or more irregularities, discrepancies and/or the like in the static and/or dynamic reports which may be indicative of potential vulnerabilities, for example, illegal system call, unauthorized service and/or permission request, excessive RAM utilization and/or the like. For example, a certain rule may define that a software package 202 directed to media playing (e.g. music, video, etc.) do not request (and hence should not be granted) permissions for accessing certain user private data, for example, contacts information. In another example, a certain rule may define that all variables in a software package 202 must be global variables. The rule based model validator(s) 204 may therefore provide an indication of one or more vulnerabilities identified in one or more of the analyzed software packages 202 based on one or more of the predefined rules.

In another example, the validators 204 may include one or more trained ML models, for example, a neural network, an SVM and/or which are trained to identify one or more of the vulnerabilities in one or more of the plurality of software packages 202 in one or more supervised training sessions using labeled training samples. For example, one or more of the software packages 202 used for training may be labeled with labels indicative of one or more vulnerabilities included in the receptive software package 202. The ML model(s) may be therefore trained in a supervised manner to associate the indicated vulnerability(s) with code attributes of the respective software package 202, for example, structure, layout, libraries, variables, permissions, hardware accesses, system calls, interrupt handling and/or the like. Moreover, the ML model(s) may be further trained in the supervised training approach using the reports generated by the static and/or dynamic analyses of one or more of the labeled software packages 202 such that the ML model(s) may evolve according to association of the indicated vulnerability(s) with the violations identified during the static code analysis and/r the dynamic code analysis. During the training, the ML model may therefore learn of design, structure and/or execution patterns which are typical to various types of software packages 202. For example, a certain pattern learned by the ML model(s) may indicate that software packages 202 accessing one or more I/O interfaces, for example, Wi-Fi typically use encryption protocols. In another example, a certain pattern learned by the ML model(s) may indicate that software packages 202 relating to media playing typically do not ask for location services.

In another example, the validators 204 may include one or more trained Deep Learning (DL) models, for example, a deep neural network trained to identify one or more of the vulnerabilities in one or more of the plurality of software packages 202 in one or more supervised, semi-supervised and/or unsupervised training sessions. During the supervised training session(s), the DL model(s) may be trained using labeled training samples as described herein before to learn and evolve based on association between the vulnerability(s) indicated for each labeled software package 202 with the code attributes of the respective software package 202. During the unsupervised training session(s), the DL model (s) may be trained using unlabeled training samples comprising software packages 202 with no label information indicating potential vulnerabilities in the respective software packages 202. As there is no need for labeling which is a major resource and time consuming task, the DL model(s) may be trained with huge amounts of training samples, namely software packages 202 and may therefore identify patterns in the software packages 202 indicative of potential vulnerabilities in the respective software packages 202. In the semi-supervised training sessions, the may be trained using both labeled and unlabeled software package 202 training samples, specifically a relatively small amount of labeled software packages 202 and a large volume of unlabeled software packages 202. The DL model may therefore evolve and learn during the training to identify patterns of design, structure and/or execution typical to various types of software packages 202. For example, a certain pattern learned by the DL model(s) may indicate that indirect branch instructions are not typically used in certain routines of one or more types of software packages 202, for example, secure session routines. In another example, a certain pattern learned by the DL model(s) may indicate that accesses to privacy related hardware, for example, camera, microphone, etc. are typically preceded in at least some types of software packages 202 by an explicit user approval.

In another example, the validators 204 may include one or more exploitation vulnerability detection tools designed to identify one or more potential exploitation vulnerabilities in one or more of the plurality of software packages 202 used for training the neural network 230. The exploitation vulnerability detection tools may include, for example, an antivirus tool, a spyware detection tool, a malware detection tool and/or the like.

Reference is made once again to FIG. 1.

As shown at 104, the training engine 220 may use the received training samples, i.e., the training software packages 202 and their associated vulnerabilities identified by the validators 204 to train the neural network 230, in one or more training sessions, to compute a probability (score) of presence of one or more of the vulnerabilities in each of the training software packages 202.

During training, which may include one or more training sessions, the neural network 230 may therefore, learn, evolve, adapt and/or adjust, for example, by adjusting its inner propagation paths, adjusting edges' weights and/or the like according to the association between the code attributes of the training software packages 202 and their associated vulnerabilities as identified by the validators 204.

Optionally, the training engine 220 may further train the neural network 230 in one or more supervised training sessions using one or more training datasets comprising training samples which associate a plurality of software packages 202 with respective vulnerability labels indicative of one or more vulnerabilities present in each respective software package 202.

As shown at 106, the training engine 220 may output the trained neural network 230 which may be applied to compute a probability of presence of one or more of the vulnerabilities in one or more new (unseen) evaluated software packages 202 based on a feed of vulnerabilities identified in the respective evaluated software package 202 by the plurality of validators 204.

The training engine 220 may output the trained neural network 230 in one or more forms and/or methods, for example, transmit the trained neural network 230 to one or more remote networked resources via the network, store the trained neural network 230 in one or more attachable media devices attached to the I/O interface 210, store the trained neural network 230 in the storage 214 and/or the like.

Reference is now made FIG. 7, which is a flowchart of an exemplary process of estimating presence of vulnerabilities in an evaluated software package using a trained neural network, according to some embodiments described herein.

An exemplary process 700 may be executed for using a trained neural network such as the trained neural network 230 to evaluate one or more software packages such as the software package 202, specifically software packages 202 intended for execution by one or more vehicular systems in one or more vehicles. In particular, the trained neural network 230 may be applied to compute a probability (score) of presence of one or more of the vulnerabilities identified in each evaluated software package 202 by a plurality of validators such as the validators 204.

Reference is also made to FIG. 8, which is a schematic illustration of an exemplary system for estimating presence of vulnerabilities in an evaluated software package using a trained neural network, according to some embodiments described herein.

An exemplary evaluation system 800, for example, a computer, a server, a processing node, a cluster of computing nodes and/or the like may be configured to execute a process such as the process 700 for applying the trained neural network to compute a presence probability of vulnerabilities in one or more evaluated software packages 202.

The evaluation system 800 may include I/O interface 810 such as the I/O interface 210, a processor(s) 812 such as the processor(s) 212 for executing the process 700 and storage 814 such as the storage 214 for storing code (program store) and/or data.

Via the I/O interface 810, the evaluation system 800 may obtain, for example, fetch, receive, acquire and/or the like one or more evaluated software packages 202 and may further receive the trained neural network 230. For example, the evaluation system 800 may communicate with one or more of the remote networked resources, for example, the evaluation system 800 may communicate with one or more of the remote network resources to receive the evaluated software package(s) 202. In another example, the evaluation system 800 may access one or more attachable devices attached to the I/O interface 810, for example, a USB storage device to retrieve the trained neural network 230 and/or one or more evaluated software packages 202.

The processor(s) 812 may execute one or more software modules such as, for example, a process, a script, an application, an agent, a utility, a tool, an Operating System (OS) and/or the like each comprising a plurality of program instructions stored in a non-transitory medium (program store) such as the storage 814 and executed by one or more processors such as the processor(s) 812. The processor(s) 812 may optionally, integrate, utilize and/or facilitate one or more hardware elements (modules) integrated and/or utilized in the evaluation system 800, for example, a circuit, a component, an IC, an ASIC, a FPGA, a DSP, a GPU, an AI accelerator and/or the like.

The processor(s) 812 may therefore execute one or more functional modules implemented using one or more software modules, one or more of the hardware modules and/or combination thereof. For example, the processor(s) 212 may execute a decision engine 820 functional module for executing the process 700 to compute probability of presence of vulnerabilities in the evaluated software packages 202.

The decision engine 820 may further generate a vulnerability report 830 indicative of one or more vulnerabilities identified in one or more of the evaluated software packages 202.

Optionally, the evaluation system 800 is integrate with the training system 200 such that the same system executed both the process 100 to train the neural network 230 and the process 700 using the trained neural network 230 to compute probability of presence of vulnerabilities in the evaluated software packages 202.

Optionally, the training system 200, specifically the training engine 220 are provided and/or utilized by one or more cloud computing services, for example, Infrastructure as a Service (IaaS), Platform as a Service (PaaS), Software as a Service (SaaS) and/or the like provided by one or more cloud infrastructures, platforms and/or services such as, for example, Amazon Web Service (AWS), Google Cloud, Microsoft Azure and/or the like. In such case, the neural network 230 may be also executed by the cloud computing service(s) during the training session(s).

As shown at 702, the process 700 starts with the decision engine 820 obtaining (e.g. receive, fetch, acquire, etc.) an evaluated software package 202 coupled with one or more vulnerabilities identified in the evaluated software package 202 by one or more of the of the validators 204.

As shown at 704, the decision engine 820 may apply the trained neural network 230 to compute the probability of presence of each vulnerability in the evaluated software package 202 based on the vulnerabilities identified in the evaluated software package 202 by one or more of the of the validators 204.

The decision engine 820 may further compute presence probability score per vulnerability and/or per risk type and/or category.

Optionally, the decision engine 820 may generate automatically the vulnerability report 830 indicative of each vulnerability, and optionally of each vulnerability occurrence identified in the evaluated software package 202.

As shown at 706, the decision engine 820 may output the probability (score) of presence of one or more occurrences of one or more of the vulnerabilities computed by the neural network 230 for the evaluated software package 202.

The training engine 220 may output the presence probability scores and optionally the vulnerability report 830 via the I/O interface 810, for example, transmit to one or more remote networked resources via the network, store in one or more attachable media devices attached to the I/O interface 810, store in the storage 814 and/or the like.

Figure 9:
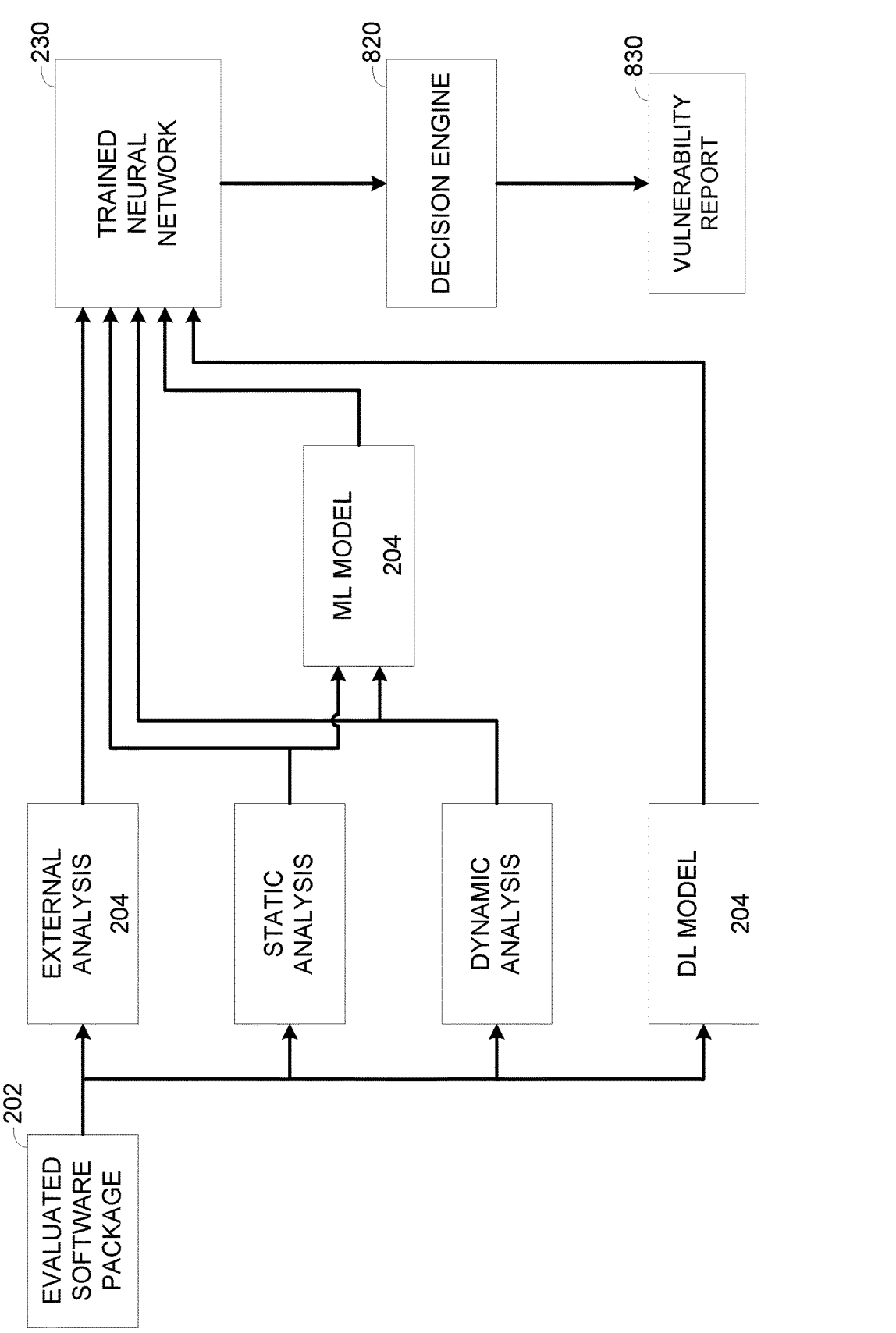
FIG. 9 is a schematic illustration of building blocks of an exemplary system for estimating presence of vulnerabilities in an evaluated software package using a trained neural network, according to some embodiments described herein.

Reference is now made to FIG. 9, which is a schematic illustration of building blocks of an exemplary system for estimating presence of vulnerabilities in an evaluated software package using a trained neural network, according to some embodiments described herein.

As seen, a plurality of validators 204, for example, an exploitation vulnerability detection tool, an ML model and a DL model may be applied to identify one or more vulnerabilities in an evaluated software package such as the software package 202.

One or more of the validators 204 may be optionally identify vulnerabilities in the evaluated software package 202 based on one or more of the code analyses, for example, static code analysis, dynamic code analysis and/or the like, specifically based on analysis of the reports and/or logs generated during the code analyses.

The vulnerabilities identified by the validators 204 may be fed to a trained neural network such as the trained neural network 230 which may compute accordingly a probability of presence of each vulnerability identified in the evaluated software package 202. A decision engine such as the decision engine 820 may aggregate the probability scores computed for the identified vulnerabilities, for example, based on vulnerability and/or risk type or category and may further output a vulnerability report such as the vulnerability report 830.

Figure 10:
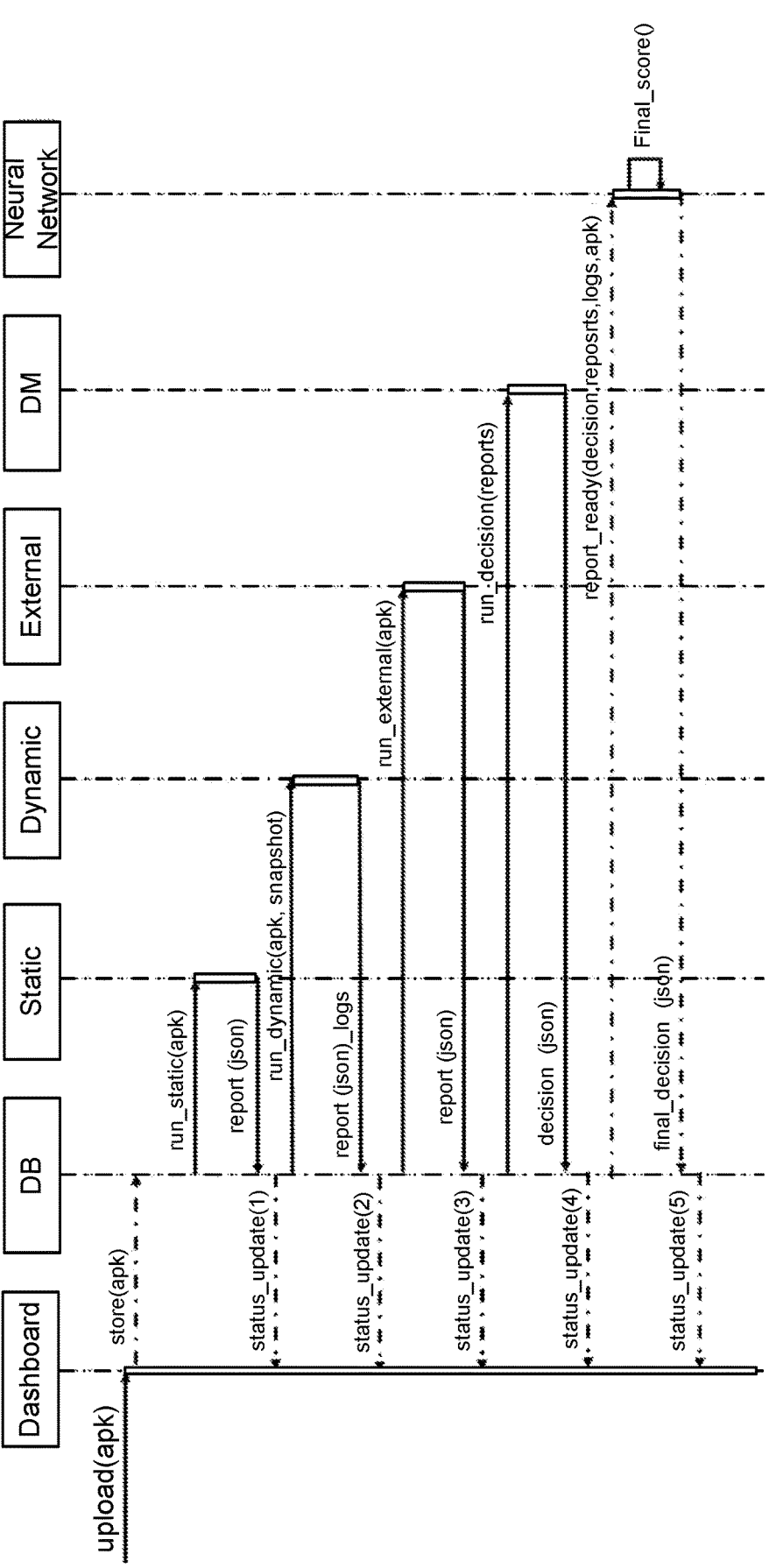
FIG. 10 is a schematic illustration of an exemplary sequence of applying a trained neural network to estimate presence of vulnerabilities in an evaluated APK, according to some embodiments described herein.

Reference is now made to FIG. 10, which is a schematic illustration of an exemplary cloud based implementation of a system for applying a trained neural network to estimate presence of vulnerabilities in an evaluated APK, according to some embodiments described herein. A sequence following the process 700 may be executed by a decision engine such as the decision engine 820 and may be presented to a user, for example, an expert user, for example, via a dashboard application displayed using a Graphic User Interface (GUI) presented on a display of an evaluation system such as the evaluation system 800 and/or on a display of a remote client device (e.g. compute, laptop, tablet, smartphone, etc.) connected to the evaluation system 800 via a network.

The sequence may include first conducting one or more code analyses on an evaluated software package such as the software package 202, for example, the APK. The analyses may include, for example, a static analysis, a dynamic analysis and/or an external analysis (using one or more vulnerability exploitation detection tools). One or more ML models and/or DL models validators 204 designated DM in FIG. 10 may be than applied to the software package 202 and optionally to the output of one or more of the code analyses (e.g. static report, logs, etc.) to identify one or more potential vulnerabilities in the evaluated software package 202 which are eventually driven (fed) to a trained neural network such as the trained neural network 230 which may compute the probability of presence of each of the vulnerabilities identified in the evaluated software package 202.

The descriptions of the various embodiments described herein have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant systems, methods and computer programs will be developed and the scope of the terms neural networks and software code analysis are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments described herein may be presented in a range format. It should be understood that the description in range format is merely for convenience and brevity and should not be construed as an inflexible limitation on the scope of the embodiments described herein. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment described herein may include a plurality of "optional" features unless such features conflict.

It is appreciated that certain features of the embodiments described herein, which are, for clarity, described in the context of separate embodiments, may also be provided in combination in a single embodiment. Conversely, various features of the embodiments described herein, which are, for brevity, described in the context of a single embodiment, may also be provided separately or in any suitable subcombination or as suitable in any other described embodiment. Certain features described in the context of various embodiments are not to be considered essential features of those embodiments, unless the embodiment is inoperative without those elements.

Although the embodiments described herein have been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the embodiments described herein. To the extent that section headings are used, they should not be construed as necessarily limiting. In addition, any priority document(s) of this application is/are hereby incorporated herein by reference in its/their entirety.

What is claimed is:

1. A computer implemented method of training a neural network to evaluate vulnerability of software packages, comprising:

using at least one processor for:

receiving a plurality of training samples each associating one of a plurality of software packages with one of a plurality of vulnerabilities identified by one of a plurality of validators;

training a neural network using the plurality of training samples to compute a probability of presence of at least one of the plurality of vulnerabilities in each of the plurality of software packages; and outputting the trained neural network for computing a probability of presence of the at least one vulnerability in at least one previously unseen software package based on a feed of vulnerabilities identified in the at least one previously unseen software package by the plurality of validators, wherein the plurality of different types of validators comprises at least one rule based model configured to analyze at least one of the plurality of software packages according to at least one of a plurality of heuristics, at least one machine learning model supervised training session to identify the at least one vulnerability in at least one of the plurality of software packages, and at least one deep learning model trained in at least one training session to identify the at least one vulnerability in at least one of the plurality of software packages.

2. The computer implemented method of claim 1, wherein the plurality of software packages are directed for execution in at least one vehicle where each of the plurality of vulnerabilities may potentially compromise operation of the at least one vehicle.

3. The computer implemented method of claim 1, wherein each of the plurality of vulnerabilities imposes at least one risk when the respective software package is executed, the at least one risk is a member of a group consisting of: a security risk, a privacy risk, a user attention distraction risk and a malicious intervention risk.

4. The computer implemented method of claim 1, wherein the plurality of vulnerabilities comprise at least one of: a vulnerability potentially leading to improper execution of at least one software package and a vulnerability exploitable for compromising the execution of at least one software package.

5. The computer implemented method of claim 1, wherein the at least one machine learning (ML) model is trained using labeled training samples generated by at least one of a static code analysis and a dynamic code analysis of the at least one of the plurality of software packages.

6. The computer implemented method of claim 1, wherein the at least one training session is a member of a group consisting of: a supervised training session using labeled training samples, an unsupervised training session using unlabeled training samples and a semi-supervised training session using labeled and unlabeled training samples.

7. The computer implemented method of claim 1, wherein the at least one rule based model comprises at least one predefined rule indicating at least one of irregularities and discrepancies in the at least one report indicative of potential vulnerabilities.

8. The computer implemented method of claim 1, wherein the plurality of validators further comprises at least one exploitation vulnerability detection tool designed to identify at least one potential exploitation vulnerability in at least one of the plurality of software packages.

9. The computer implemented method of claim 1, wherein the plurality of validators further comprises at least one expert user manually analyzing at least one of the plurality of software packages.

10. The computer implemented method of claim 1, wherein at least one of the plurality of validators is based on static code analysis of at least one of the plurality of software packages.

11. The computer implemented method of claim 1, wherein at least one of the plurality of validators is based on dynamic code analysis of at least one of the plurality of software packages.

12. The computer implemented method of claim 11, wherein the dynamic analysis is executed in a sandbox environment of at least one evaluation system isolated from an operational execution environment of the at least one evaluation system.

13. The computer implemented method of claim 1, further comprising training the neural network in at least one supervised training session with at least one dataset comprising training samples associating a plurality of software packages with respective vulnerability labels.

14. A system for training a neural network to evaluate vulnerability of software packages, comprising:
  at least one processor adapted to execute code, the code comprising:
    code instructions to receive a plurality of training samples each associating one of a plurality of software packages with a respective one of a plurality of vulnerabilities identified by one of a plurality of validators;
    code instructions to train a neural network using the plurality of training samples to compute a probability of presence of at least one of the plurality of vulnerabilities in each of the plurality of software packages; and
    code instructions to output the trained neural network for computing a probability of presence of the at least one vulnerability in at least one previously unseen software package based on a feed of vulnerabilities identified in the at least one previously unseen software package by the plurality of validators, wherein the plurality of validators comprises at least one rule based models configured to analyze at least one of the plurality of software packages according to at least one of a plurality of heuristics, at least one machine learning model supervised training session to identify the at least one vulnerability in at least one of the plurality of software packages, and at least one deep learning model trained in at least one training session to identify the at least one vulnerability in at least one of the plurality of software packages.

15. A computer implemented method of evaluating vulnerability of software packages, comprising:
  using at least one processor for:
    receiving at least one of a plurality of vulnerabilities identified in an evaluated software package by a plurality of validators;
    feeding the at least one vulnerability to a neural network trained to compute a probability of presence of at least one occurrence of the at least one vulnerability in the evaluated software package, the neural network is trained using a plurality of training samples associating a plurality of software packages with at least one of the plurality of vulnerabilities identified in the plurality of software packages by the plurality of validators, wherein the plurality of validators comprises at least one rule based models configured to analyze at least one of the plurality of software packages according to at least one of a plurality of heuristics, at least one machine learning model supervised training session to identify the at least one vulnerability in at least one of the plurality of software packages, and at least one deep learning model trained in at least one training session to identify the at least one vulnerability in at least one of the plurality of software packages; and
    outputting the probability of presence of the at least one occurrence of the at least one vulnerability in the evaluated software package.

16. The computer implemented method of claim 15, further comprising generating automatically a report indicative of each vulnerability identified in the evaluated software package.

* * * * *